United States Patent Office 3,257,146
Patented June 21, 1966

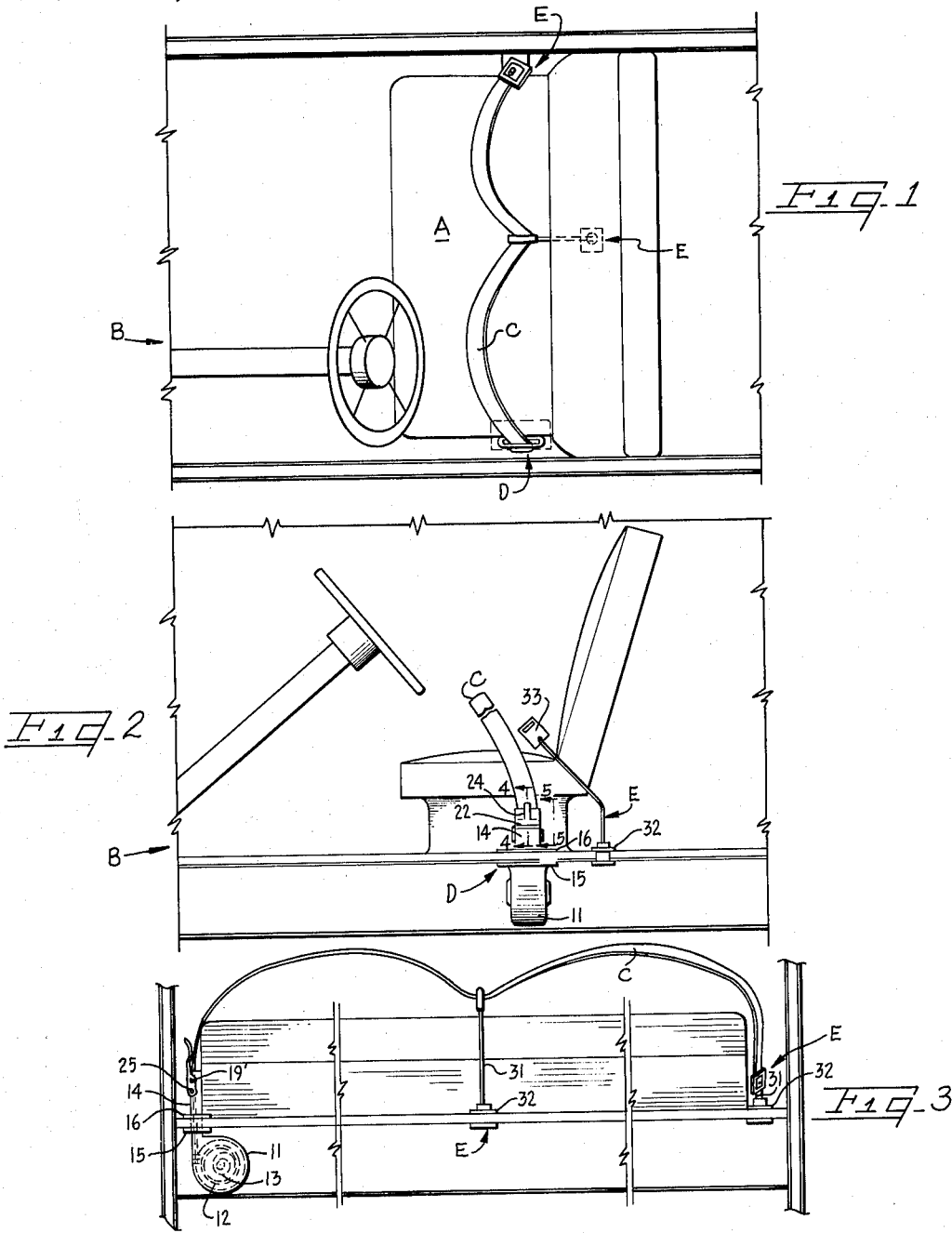

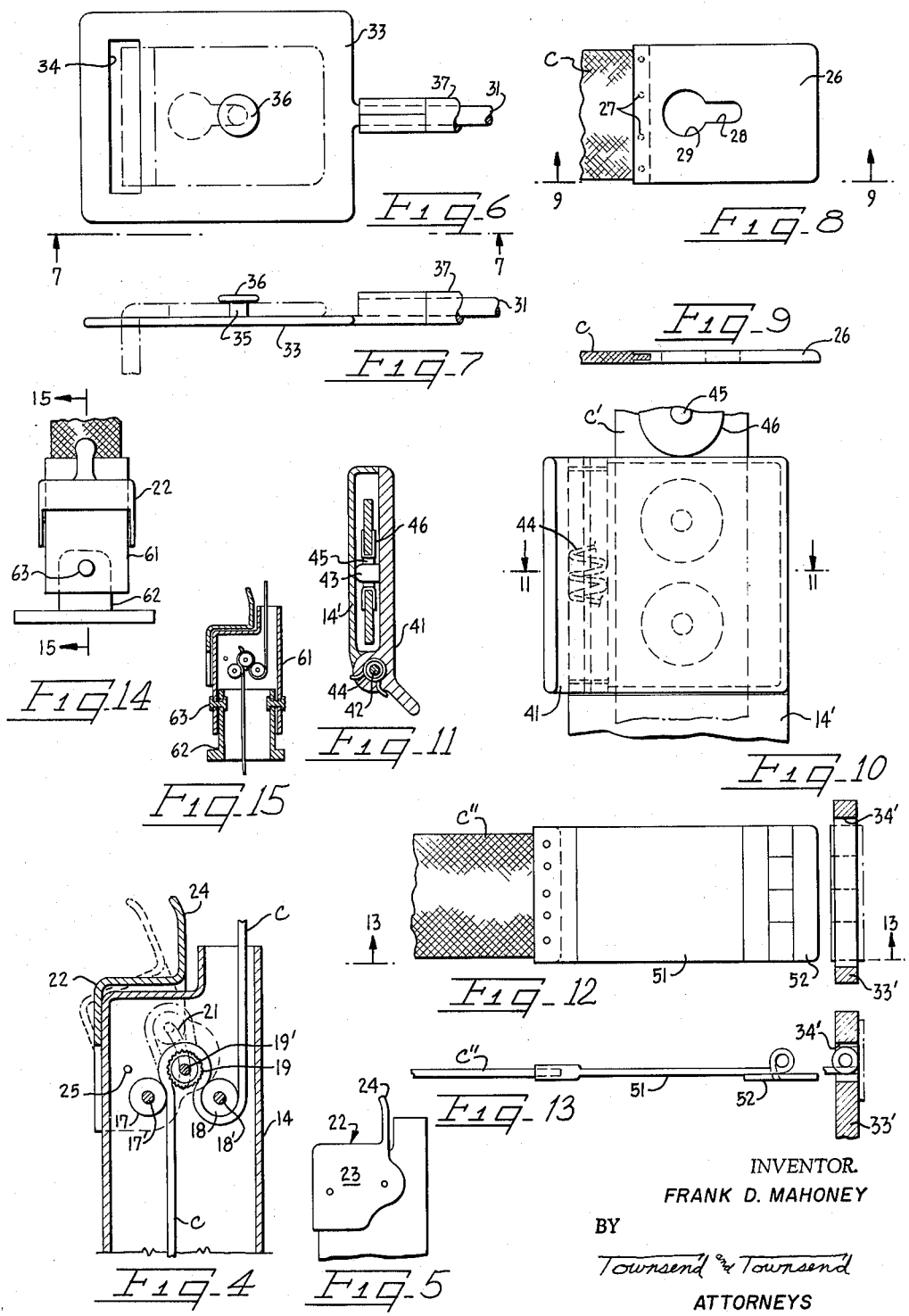

3,257,146
SEAT BELT ASSEMBLY
Frank D. Mahoney, 68 Mulberry Lane, Atherton, Calif.
Filed Oct. 10, 1963, Ser. No. 315,191
2 Claims. (Cl. 297—388)

The present invention relates in general to passenger safety devices and more particularly to a seat belt assembly for holding passengers in their seats in case of accident.

While for convenience the invention will be described below with respect to use in an automobile, it is obvious that the seat belt assembly according to this invention can be used in any vehicle such as an airplane, train, bus, truck or the like where for the safety of the passengers it is desirable to provide seat belts to keep the passengers from being thrown out of their seats.

Broadly speaking, the seat belt assembly according to the present invention, and to be described in greater detail below, includes an inelastic belt mounted on a spring loaded storage reel in a housing secured to a vehicle at one side of the passenger. The belt is utilized by pulling across the passenger the desired length of belt from the housing and attaching the free end of the belt to a holding member which is fixedly secured to the vehicle on the other side of the passenger. A locking means locks the other end of the withdrawn length of belt to the vehicle so that the force on the belt when the passenger is thrown forward is applied directly to the vehicle and not transmitted to the belt storage reel.

Conventional seat belts get tangled and twisted or fall to the front or back floor when not in use so that they either are in the way when the passenger sits down or are inaccessible. These belts often lie on the floor or hang outside the automobile and become wet and dirty so that the passenger hesitates to stretch them across his clothing.

With the seat belt assembly according to the present invention these disadvantages of conventional seat belts are eliminated by retracting the belt when not in use so that the belt is not only out of the way but is stored in a dirt-free housing. Also, the belt is always properly in place ready for use.

Furthermore, with conventional adjustable length seat belts, it is usually necessary to adjust the belt length when a different person occupies one particular seat or when the position of the seat on the floor is changed since the belt must be anchored to the vehicle body and not the seat.

On the other hand with seat belt assemblies according to the present invention every time the belt is used just the desired length of belt is withdrawn from the housing before the belt is locked for use thereby avoiding the necessity for additional adjustments. Additionally, since in the seat belt assembly according to the present invention the seat belt is secured at the side rather than in front of the passenger, the hazards of having the belt buckle in the center of the passenger's body as with conventional seat belts are eliminated.

Since the locking assembly is at the side of the passenger's seat, a quick check of all the locking assemblies to make certain all passengers are belted can be made in vehicles such as airplanes and buses having a center aisle.

Other objects and features and advantages of the present invention will become apparent upon reading the following specification and referring to the accompanying drawing in which similar characters of reference represent corresponding parts in each of the several views.

In the drawing:

FIG. 1 is a plan view showing the front seat of an automobile equipped with the seat belt assembly according to the present invention;

FIG. 2 is a side elevational view of the structure illustrated in FIG. 1;

FIG. 3 is a rear elevational view of the structure shown in FIG. 1 taken from the rear of the seat and between the lower and the back seat cushions;

FIG. 4 is a sectional view of a portion of the structure shown in FIG. 2 taken along the line 4—4 in the direction of the arrows;

FIG. 5 is a side elevational view of the locking means shown in FIG. 2 taken along line 5—5 in the direction of the arrows;

FIG. 6 is a plan view of the belt holder shown in FIGS. 1–3;

FIG. 7 is a side elevational view of the structure shown in FIG. 6 taken along line 7—7;

FIG. 8 is a plan view of the belt tongue utilized in one embodiment of the present invention;

FIG. 9 is a side elevational view of the structure shown in FIG. 8;

FIG. 10 is an elevational view showing a locking member according to an alternative embodiment of the present invention;

FIG. 11 is a sectional view of a portion of the structure shown in FIG. 10 taken along line 11—11 in the direction of the arrows;

FIG. 12 is a plan view of a belt clasp according to an alternative embodiment of the present invention showing two positions of the clasp;

FIG. 13 is a side view, partially in section, of the structure shown in FIG. 12 taken along line 13—13 in the direction of the arrows;

FIG. 14 is a side elevational view showing an alternative embodiment of the present invention; and FIG. 15 is a sectional view showing a portion of the structure shown in FIG. 14 taken along line 15—15 in the direction of the arrows.

Referring now to FIGS. 1–3 of the drawing, the seat belt assembly according to the present invention is illustrated as utilized for holding the driver and passengers in the front seat A of an automobile B. The seat belt assembly includes an inelastic strap or belt C which is stored and held by a retracting and locking assembly D, and when in use held at the other end thereof and, if desired, at intermediate points by a holding assembly E, two of which are shown in the drawing.

The retracting and holding assembly D includes a storage reel housing 11 in which a reel drum 12 is rotatably mounted for winding and storing the seat belt C one end of which is fixedly secured to the drum 12. Tension is continuously applied to the belt C by torque applied to the drum 12 such as, for example, by a coil spring 13, the outer end of which is secured to the interior surface of the drum 12 and the inner end of which is secured to a fixed axle. Obviously other structures can be utilized for winding and applying tension to the belt.

The housing 11 is provided with an integral channel member 14 which projects upwardly through an aperture in the floor to carry the belt C, contained therein into the automobile. The housing is held in place by a lower flange 15 which projects from the channel member 14 and seats against the underside of the floor and an upper flange 16 which slides over the upper end of the channel member 14 and seats against the upperside of the floor. These flanges 15 and 16 are provided with mating bolt holes so that when corresponding apertures are drilled in the floor bolts can be passed therethrough to secure the flanges 15 and 16 together and thereby secure the housing 12 and channel member 14 to the vehicle. Obviously the channel member 14 can be made as a part separate from the housing 11 and flanges 15 and 16 utilized to secure these parts together.

A locking mechanism (see FIGS. 4 and 5) is provided in the channel member 14 and includes first and second rollers 17 and 18, respectively, which are respectively rotatably mounted on axles 17' and 18'. The axles 17' and 18' extend transversely of the channel member 14 and have their ends fixedly secured to the channel side walls to maintain the rollers 17 and 18 a fixed distance apart. A slidable roller 19 is mounted on an axle 19', the ends of which extend through arcuate slots 21 in the channel side walls. The slots 21 extend into the space between rollers 17 and 18 so that the roller 19 can be brought substantially into engagement with the rollers 17 and 18.

The outward ends of the axle 19' are fixedly supported in a handle 22 which has side extensions 23 along the channel side walls and a finger portion 24 at the top of the channel member 14. This handle 22 is rotatably mounted on the channel member 14 by means of, for example, axially aligned rivets 25 extending through the handle side extensions and the channel side walls, the common axis of these rivets 25 being parallel to the axis of the axle 19'. The arcuate slot 21 has a center of curvature on the axis of the rivets 25 so that when the handle finger portion 24 is pulled away from the channel member 14, the roller 19 is pulled upwardly and away from the rollers 17 and 18.

When the seat belt C has been threaded into the retracting and locking assembly D, the belt C passes from the drum 12, to which it is secured, upwardly between rollers 17 and 18, over the top of the roller 19, down between the rollers 17 and 18 again and around the bottom roller 18 with the free end of the belt C extending upwardly from roller 18 and out the top open end of the channel member 14. The belt is preferably threaded into the assembly D and the spring 13 wound to the desired amount of belt tension at the factory so that the assembly D can then be sealed. However, the housing 11 can be provided with a removable cover so that the belt can be replaced or the belt tension readjusted.

The free end of the belt C is provided with a clasp or latching member illustrated as a tongue 26 in FIGS. 8 and 9. The tongue is secured to the end of the belt by, for example, a series of rivets 27 and is of slightly greater width than the width of the channel member 14 so that after the tongue is secured to the free end of the belt C, the belt cannot be completely withdrawn into the retracting and locking assembly D. The central portion of the tongue 26 is provided with a longitudinal slot 28 which is provided at the end thereof closest to the belt C with an enlarged circular opening 29.

The cylindrical surface of the slidable roller 19 and at least one of the other rollers 17 and 18 is roughened, such as by knurling, at 30 so that when the slidable roller 19 is in its lowermost position, tension on the belt pulls the rollers closer together to squeeze and lock the belt.

Referring now to FIGS. 6 and 7, the receiving and holding assembly E includes a cable 31 of, for example, steel, one end of which is secured to the floor of the vehicle by a bracket 32 bolted thereto as shown in FIG. 2. The other end of the cable 31 is secured to a plate 33 which is provided with a transverse slot 34 adapted to receive the belt and belt tongue 26. A post 35 of a diameter slightly less than the narrow width of the tongue slot 28 projects from one face of the plate 33 and is provided with an enlarged head 36 having a diameter slightly less than that of the enlarged opening 29 in the tongue 26. In order to protect the passengers and upholstery of the automobile as well as to improve the appearance of the seat belt assembly the cable 31 is provided with a plastic covering 37.

The seat belt assembly is utilized by moving the handle finger portion 24 away from the channel member 14 and pulling the desired length of belt from the drum 12. Then the tongue 26 of the belt C is passed through the transverse slot 34 in the plate 33. The plate post 35 is passed through the enlarged slot opening 29 and slid into the narrow portion of the slot from which the tongue cannot be removed due to the enlarged head 36 as shown in phantom in FIGS. 6 and 7. If continuous tension by the belt on the passenger's body is desired, the handle 22 can again be lifted so that any excess length of belt is pulled back onto the drum 12. Unless release of the handle 22, the rollers are forced toward one another to squeeze and lock the belt due to the tension on the belt resulting from the spring torque on the reel drum.

If any forces tend to throw the passenger forward from his seat, these forces will be transmitted by the length of belt C stretched across the passenger directly to the vehicle frame by means of the cable 31 at one end of that belt length and the locking assembly and channel member 14 at the other end to hold the passenger in his seat. These same forces tending to throw the passenger forward from his seat result in a force directed downward on the roller 19, thereby increasing the locking forces on the belt C. Thus, the tension on the belt in the retracting and locking assembly not only serves to retract the belt but also serves to lock the belt against movement in such a manner that in case an accident should occur the locking forces on the belt are increased.

As shown in FIGS. 1 and 3, the seat belt assembly according to the present invention can be utilized to hold more than one passenger. As illustrated therefor use with two passengers the belt C is merely passed through the transverse slot of the plate 33 in the holding assembly E at the middle of the seat and is extended onto the holding assembly on the side of the seat away from the driver and the retracting and locking assembly. For convenience the transverse slot 34 can be opened at one end so that the belt C can be slid into the slot from the side of the plate 33. Obviously, the belt can be passed in front of a number of passengers without being threaded through the holding members between the passengers. As a safety precaution a cable release can be provided at the driver's side of the automobile to operate a belt release mechanism at the other side of the car in the event that the belt is being utilized to protect several passengers on the seat and the person closest the belt end is unable to unhook it for some reason.

Obviously, a seat belt assembly of the type described can be provided for every passenger if desired.

As an alternative embodiment of the present invention, the locking assembly as illustrated in FIGS. 10 and 11 can be utilized in place of the locking assembly described above. Referring now to FIGS. 10 and 11 a handle 41 is hinged by means of a pin 42 at one side of the upper end of the channel member 14'. The handle 41 which serves as the cover for the end of the channel member 14' is provided with a pair of spaced apart prongs 43 extending to substantially the other side of the channel member 14' when the handle is held in closed position by means of a spring 44. In this embodiment of the invention the belt C' is provided with a series of holes 45 each surrounded by a grommet 46 in those portions along the length of the belt where the belt is likely to be locked.

In utilizing the locking assembly shown in FIGS. 10 and 11, the handle 41 is opened, the belt withdrawn and when the handle is closed, the prongs 43 will seat in the cloest pair of holes 45 when the belt is retracted by the spring action on the belt drum.

Obviously many different belt clasps can be utilized such as the clasps on existing seat belts, buckles or a snap latch. One such arrangement, illustrated in FIGS. 12 and 13, includes a tongue 51 provided on the end of the belt C''. A plate 52 is hinged in its central portion to the end of the tongue 51. To secure the belt to the holding member 33' the hinged plate 52 is rotated to lie parallel to the body of the tongue 51 so that the plate can be passed through a transverse slot 34' in a holding member 33'. After passing through the slot 34, the hinged plate 52 is rotated to lie normal to the main body of the tongue 51 whereby it will not pass back through the slot in the holding member 33'. The tension on the belt holds the hinged plates 52 in place to prevent its passage through the slot 34'.

In certain instances, such as where there is large movement of the seat with respect to the frame, it may be desirable to have the locking assembly rotatably mounted on the end of the channel member so that the locking assembly can pivot. This construction permits the belt leaving the locking assembly to be directed substantially in the direction in which force is applied to it instead of being twisted as it comes out of the locking assembly. The structure shown in FIGS. 14 and 15 is adapted to permit this rotation of the locking assembly by providing the locking assembly on a channel portion 61 which is rotatably mounted on a fixed channel member 62 by means of a pair of axially aligned rivets 63.

As a safety precaution a warning device such as a light or alarm can be connected to the automobile ignition to remind a driver to fasten his seat belt when starting his automobile. This warning device can be triggered by any one of a number of mechanisms which indicate that the belt is not fastened; for example, means responsive to the amount of belt wound on the reel drum or means responsive to whether or not the clasp is fastened. In an airplane such warning devices can be provided in a bank so that the stewardess can tell at a quick glance which seat belts are fastened.

Obviously, in those vehicles where the passenger can reach the floor such as, for example, an automobile having bucket seats, the cable 31 of the receiving and holding assembly E can be eliminated and the plate 33 secured to the vehicle directly at the floor.

Although the foregoing invention has been described in some detail by way of illustration and example for purposes of clarity of understanding, it is understood that certain changes and modifications may be practiced within the spirit of the invention as limited only by the scope of the appended claims.

I claim:

1. A retractable seat belt assembly in a vehicle to restrain passengers in their seats comprising: an elongate, substantially inelastic seat belt; a belt retracting and storing means including a housing, a drum for winding said belt thereon, means for rotatably mounting said drum in said housing, and means for applying a continual torque to said drum to produce a continual tension on at least a portion of said belt, thereby to retract said belt when not in use; a channel member fixedly secured to the vehicle on one side of the passenger and communicating with said housing and adapted to pass said belt therethrough; one end of said belt secured to said drum and the other end of said belt projecting outside said housing and said channel member; means fixedly secured to the vehicle on the other side of the passenger from said channel member for receiving and holding said other end of said belt; and locking means connected to said channel member for releasably locking a portion of said belt to the vehicle and including a pair of spaced apart rollers, each of said rollers having an axle fixed in parallel relationship with the axle of the other roller, a slidable roller having an axle slidably supported for movement with respect to the axles of said pair of rollers, said belt passing from said drum between said pairs of rollers in contact with a peripheral portion of one of said pair, then around said clamping roller in contact with more than half the circumferential surface of said clamping roller and then between said pairs of rollers in contact with a peripheral portion of the other of said pair, and handle means for moving the movable roller from a belt locked position wherein said clamping roller is pulled toward said pair of rollers by said continual tension to clamp said belt between said clamping roller and each roller of said pair of rollers whereby said belt passes over said rollers and is locked against movement to a released position wherein said clamping roller is spaced from each roller of said pair of rollers by a distance greater than the thickness of said belt therebetween whereby said belt is able to move over said rollers whereby with said handle means in said released position the desired length of belt is pulled by said other end of said belt across the passenger and secured to the receiving and holding means and with said handle means in said locked position the portion of the belt passing through said locking means is locked to said channel member so that the length of belt extending across the passenger is held at the ends thereof and the passenger restrained in his seat.

2. A retractable seat belt assembly for use in a vehicle to hold passengers in their seats comprising: an elongate, substantially inelastic seat belt; a belt retracting and storing means including a drum for winding said belt thereon, means for rotatably mounting said drum on said vehicle, and means for applying a continual torque to said drum to produce a continual tension on at least a portion of said belt thereby to retract said belt when not in use; a portion of said belt wound on said drum with one end of said belt secured to said drum and the other end of said belt free; means fixedly secured to the vehicle on one side of the passengers for receiving and holding said free end of said belt; and locking means mounted on said vehicle on the opposite side of said passenger from said receiving and holding means for releasably locking a portion of said belt to the vehicle and including a pair of spaced apart, parallel rollers, a clamping roller slidably mounted parallel to said pair of rollers for movement toward and away from said pair of rollers, said belt passing from said drum between said pair of rollers in contact with a peripheral portion of one of said pair, then around said clamping roller and then between said pair of rollers in contact with a peripheral portion of the other of said pair, and means for moving said clamping roller from a belt locked position wherein said clamping roller is pulled toward said pair of rollers by said continual tension to clamp said belt between said clamping roller and each roller of said pair of rollers whereby said belt is locked against movement to a released position wherein said clamping roller is spaced from each roller of said pair of rollers by a distance greater than the thickness of said belt therebetween whereby said belt is able to move over said rollers.

References Cited by the Examiner

UNITED STATES PATENTS

| | | | |
|---|---|---|---|
| 2,071,903 | 2/1937 | Shively | 297—388 |
| 2,488,858 | 11/1949 | Frang | 297—388 |
| 2,725,097 | 11/1955 | Thoreson | 297—388 |
| 2,798,539 | 7/1957 | Johnson | 297—388 |
| 2,971,730 | 2/1961 | Martin | 297—388 |
| 3,180,684 | 4/1965 | Marano | 297—388 |

FRANK B. SHERRY, *Primary Examiner.*

J. S. PETRIE, *Assistant Examiner.*